United States Patent [19]
Wu

[11] Patent Number: 5,808,568
[45] Date of Patent: Sep. 15, 1998

[54] FINGER OPERATED MODULE FOR GENERATING ENCODING SIGNALS

[75] Inventor: Chih-Hsiung Wu, Taipei Hsien, Taiwan

[73] Assignee: Primax Electronics, Ltd., Taipei Hsien, Taiwan

[21] Appl. No.: 823,134

[22] Filed: Mar. 25, 1997

[51] Int. Cl.⁶ ............................................. G09G 5/00
[52] U.S. Cl. .......................... 341/20; 341/173; 345/167; 345/163
[58] Field of Search ............................... 341/20, 35, 173; 345/164, 163, 157, 165, 167, 156, 123

[56] References Cited

U.S. PATENT DOCUMENTS

| | | | |
|---|---|---|---|
| 5,095,302 | 3/1992 | McLean | 345/164 |
| 5,132,672 | 7/1992 | Clark | 345/164 |
| 5,313,229 | 5/1994 | Gilligan | 345/157 |
| 5,374,942 | 12/1994 | Gilligan | 345/157 |
| 5,457,479 | 10/1995 | Cheng | 345/163 |
| 5,530,455 | 6/1996 | Gillick | 345/163 |

OTHER PUBLICATIONS

Photo of Panasonis remote control w scroll wheel, Dec. 1, 1995.

Primary Examiner—Michael Horabik
Assistant Examiner—Albert K. Wong
Attorney, Agent, or Firm—Bacon & Thomas

[57] ABSTRACT

A finger operated module generates encoding signals by controlling transmission of light in response to finger operation of the module. The module includes a base member, a supporting member movably installed on the base member, and a rotating member rotatably installed on the supporting member, the rotating member partially protruding from a surface of the input device for enabling finger operation. An encoding signal generating media for controlling the transmitted light is provided on a first surface of the rotating member.

11 Claims, 3 Drawing Sheets

FINGER OPERATED MODULE FOR GENERATING ENCODING SIGNALS

BACKGROUND OF THE INVENTION

1. Field of the Invention

The present invention relates to an operation interface, and more particularly, to a finger operated module for generating encoding signals.

2. Description of the Prior Art

A computer mouse is a very popular computer peripheral which can be used to control cursor movement and function selection for software under Windows™ or a similar operating application system. A traditional computer mouse used by a personal computer is usually a two-dimensional one for controlling the cursor movement on an X-Y plane on the monitor screen, and key buttons are provided on the mouse to be selected according to the requirements of the application software.

However, such a two-dimensional computer mouse can no more meet users' needs in view of the increased requirements for convenience in operational operating system interfaces. A three-dimensional computer mouse has thus been created which can be used to define certain system control functions, e.g. scrolling of a window frame, of a Windows™ or similar operating system for providing users a more rapid and convenient input device.

SUMMARY OF THE INVENTION

It is therefore a primary object of the present invention to provide a finger operated module for generating encoding signals which is used to generate encoding signals in response to operation by a finger to control transmission of light by the module, and wherein the module partially protrudes from one surface of an input device.

Briefly, in a preferred embodiment, the present invention comprises:
(1) a base member;
(2) a supporting member movably installed on the base member; and
(3) a rotating member rotatable on the supporting member and partially protruding from the surface of the input device for accommodating the finger operation;
wherein an encoding signal generating media for controlling the transmitted light is provided on a first surface of the rotating member.

In accordance with a first aspect of the present invention, the module further comprises a printed circuit board mounted on the supporting member, a light emitting element mounted on the printed circuit board adjacent to the first surface of the rotating member for generating the light transmitted through the encoding signal generating media, and a light responsive element mounted on the printed circuit board adjacent to a second surface of the rotating member for receiving the light to generate digital signals, and wherein the light emitting element and the light responsive element are able to be synchronously moved with the supporting member.

In accordance with a second aspect of the present invention, the base member has a positioning plate and a pair of supporting pieces orthogonal to the positioning plate, and each of the supporting pieces has a groove for allowing the supporting member to be movably installed on the base member. The rotating member includes an axle rotatable coupled to the supporting member.

In accordance with a third aspect of the present invention, the supporting member comprises a first supporting element, a second supporting element and a connecting element for connecting the first and second supporting elements, wherein the first supporting element includes a first axis accommodated within the groove of one of the supporting pieces, and a first positioning hole for engaging the axis of the rotating member, the second supporting element includes a second axis accommodated within the groove of the other one of the supporting pieces, and a second positioning hole for engaging the axis of the rotating member.

In accordance with a fourth aspect of the present invention, the module further comprises an elastic member mounted on the supporting member which has a first elastic arm biased against a protruding portion of the supporting member and a second elastic arm biased against the base member for providing the supporting member a spring force.

In accordance with a fifth aspect of the present invention, the elastic member is mounted on the first axis of the first supporting element. The first supporting element further includes a protruding post for engaging with a switch installed in the input device when the rotating member is movably depressed. The encoding signal generating media can be a plurality of apertures which are disposed on a circumference of the surface of the rotating member.

In accordance with a sixth aspect of the present invention, the module further comprises a plurality of protuberances disposed on the circumference of the first surface of the rotating member, and a contact element mounted between the first and second supporting elements. The contact element has a protrusion for correspondingly engaging with the protuberances to cause intermittent interception when the rotating member is rotated.

In accordance with a seventh aspect of the present invention, the input device is a computer mouse.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
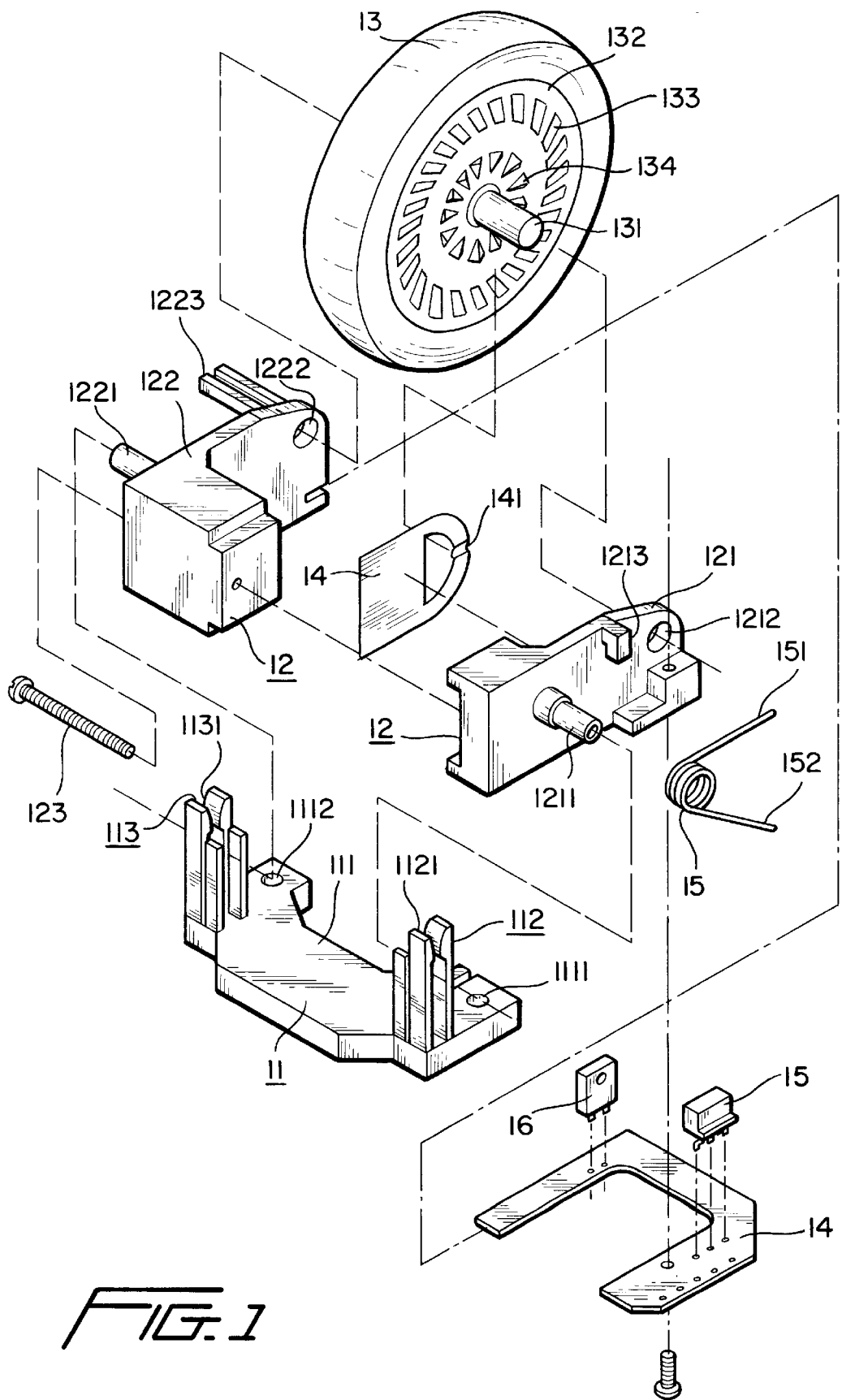
FIG. 1 is an exploded perspective view of a preferred embodiment of a finger operated module according to the present invention.

Please refer to FIG. 1, which is an exploded view of a preferred embodiment of a finger operated module according to the present invention. The finger operated module comprises a base member 11, a supporting member 12, a rotating member 13, a printed circuit board 14, a light emitting element 15 and a light responsive element 16.

A positioning plate 111 and a pair of supporting pieces 112, 113 orthogonal to the positioning plate 111 are provided on the base member 11, each of the supporting pieces 112, 113 having a groove 1121, 1131. The positioning plate 111 includes a pair of positioning holes 1111, 1112 for allowing the present finger operated module to be installed at the bottom of an input device, for instance a computer mouse.

The supporting member 12 comprises a first supporting element 121, a second supporting element 122 and a connecting element 123, which by way of example may be a screw. The first supporting element 121 includes a first axle 1211, a first positioning hole 1212 and a protruding portion 1213; the second supporting element 122 includes a second axle 1221, a second positioning hole 1222 and a protruding post 1223. The rotating member 13 includes an axle 131 and an encoding signal generating media, where such encoding signal generating media can be a plurality of apertures 133 which are disposed on a circumference of the surface 132 of the rotating member 13.

The preferred module further comprises a plurality of protuberances 134 disposed on the circumference of the surface 132 of the rotating member 13, a contact element 14 having a protrusion 141 thereon, and an elastic member 15 having a first elastic arm 151 and a second second elastic arm 152.

The printed circuit board 14 is mounted in a traditional manner, e.g. by a screw, on the supporting member 12, the light emitting element 15 is mounted on the printed circuit board 14 adjacent to the first surface 132 of the rotating member 13 for generating a light to be transmitted through the encoding signal generating media, and the light responsive element 16 is mounted on the printed circuit board 14 adjacent to a second surface(not shown) of the rotating member 13 for receiving the transmitted light to generate digital signals, so that the light emitting element 15 and the light responsive element 16 are able to be synchronously moved with the supporting member 12.

Figure 2:
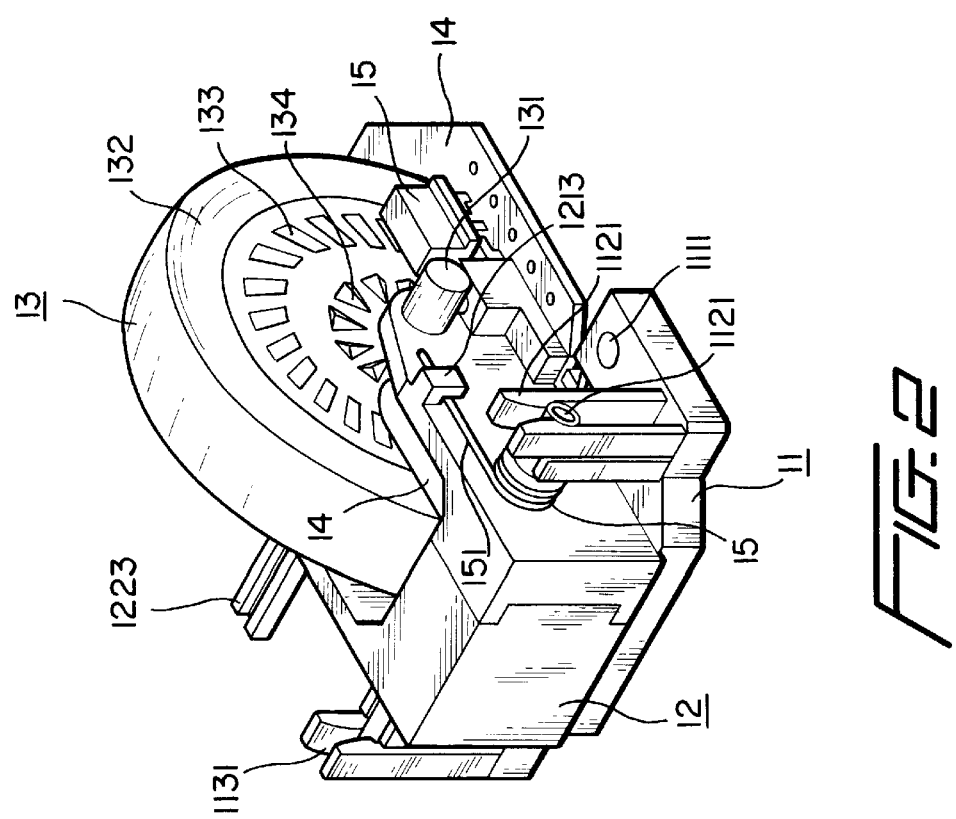
FIG. 2 is an assembled perspective view of the preferred embodiment of FIG. 1.

Please refer to FIGS. 1 and 2 which show the assembly of the present invention. The present module is assembled by the following steps: (a) connecting the first supporting element 121 and the second supporting element 122 by means of the connecting element 123 for allowing the contact element 14 to be installed between the first and second supporting elements 121, 122; (b) inserting both ends of the axis 131 of the rotating member 13 into the first and second grooves 1212, 1222 of the first and second supporting elements 121, 122, respectively, for allowing the rotating member 13 to be rotatably installed on the supporting member 12; (c) mounting the elastic member 15 on the first axis 1211 of the first supporting element 121 and biasing the first elastic arm 151 of the elastic member against the protruding portion 1213 of the first supporting element 121; (d) accommodating the first and second axes 1211, 1221 of the first and second supporting elements 121, 122 within the grooves 1121, 1131 of the pair of supporting pieces 112, 113, respectively, for allowing the supporting member 12 to be movably installed on the base member 11, and biasing the second elastic arm 152 of the elastic member 15 bias against the positioning plate 111 of the base member 11.

Figure 4:
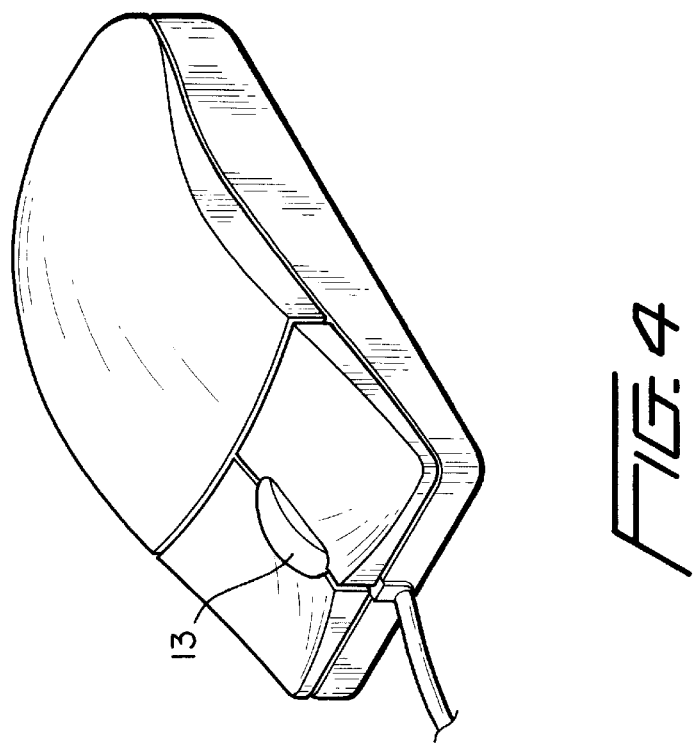
FIG. 4 is a perspective view illustrating the assembly of the preferred module and the input device.
Figure 3:
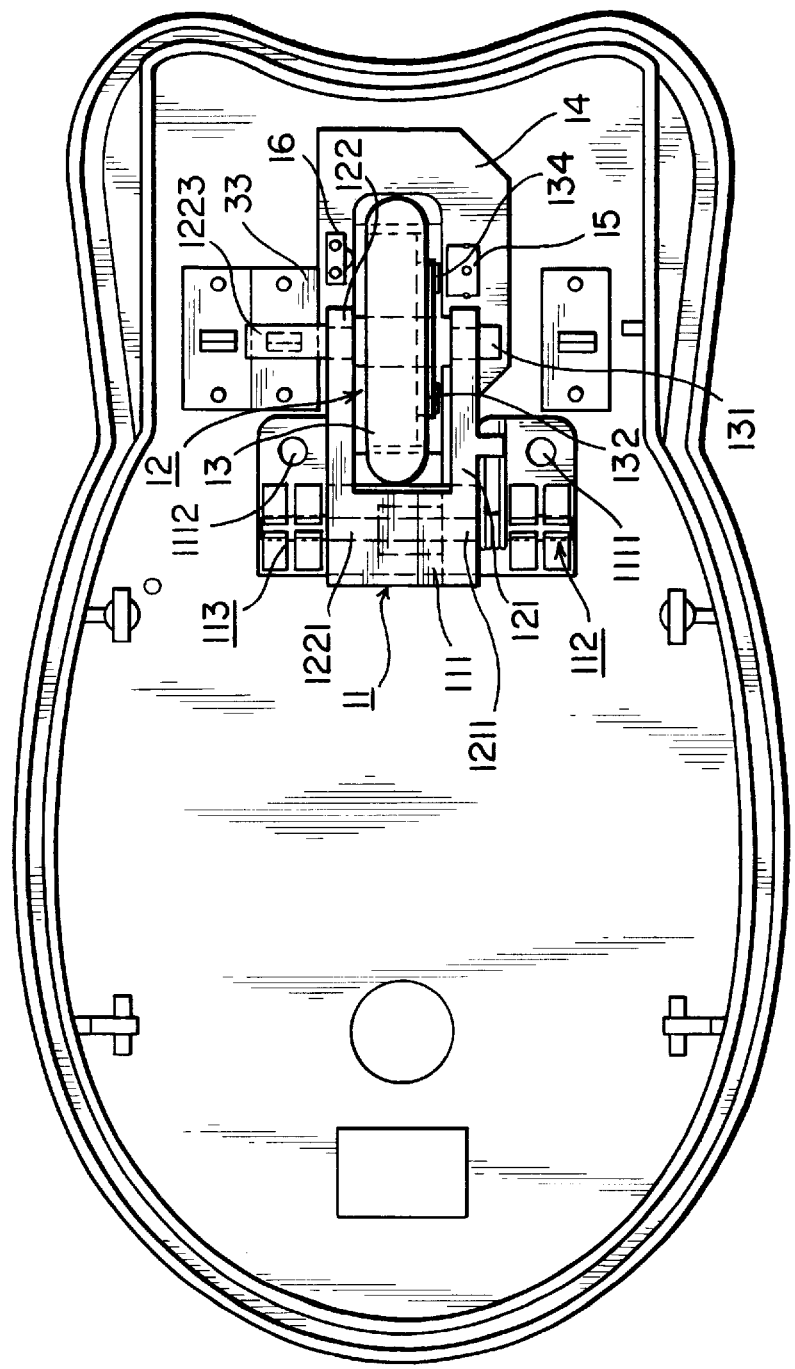
FIG. 3 is an upper plane view illustrating the preferred finger operated module installed in an input device according to the present invention.

The operation method of the present invention can be referred to FIG. 3 which is an upper plane view illustrating the preferred finger operated module installed in an input device. The module can be installed on e.g. the bottom of the computer mouse by means of the positioning holes 1111, 1112 of the positioning plate 111 of the base member 11. After the module and the computer mouse are assembled, the rotating member 13 will partially protrude from one surface of the computer mouse, as illustrated in FIG. 4, to be used as a user interface. When the rotating member 13 is rotated by fingers, penetrating/shielding effects of the light transmitted by the light emitting element 15 through the apertures 133 on the circumference of the surface 132 of the rotating member 13 to the light responsive element 16 will be generated in response to the rotation of the rotating member 13, so that the light responsive element 16 will thus generate encoding signals in the manner of traditional computer mice.

In the mean time, the protrusion 141 of the contact element 14 will correspondingly engage with the protuberances 134 to cause intermittent interception (please refer to FIG. 2) when the rotating member 13 is rotated.

Furthermore, the supporting member 12 will move downward and its protruding post 1223 will in the mean time engage with a switch 33 installed in the computer mouse to keep it in a "turn on" status, when the rotating member 13 is depressed. The light emitting element 15 and the light responsive element 16 will be synchronously moved with the supporting member 12, and when the finger pressure ceases, the supporting member 12 will return to its previous position by means of the spring force provided by the elastic member 15. The protruding post 1223 will then disengage with the switch 33 and return it to its "turn off" status. The aforementioned switch 33 is similar to that of traditional computer mouse which can perform a specific command.

It deserves a more detailed description that noises of encoding signals generated by engagement of the switch 33 can be avoided based on the synchronous movement of the light emitting element 15 and the light responsive element 16 with the supporting member 12. If the light emitting element 15 and the light responsive element 16 are not synchronously moved with the supporting member 12, a correspondant movement between the two elements 15, 16 will probably occur when the rotating member 13 is depressed. That is to say, digital signals with noise are generated after the light responsive element 16 receives an abnormal status change of lights transmitted between the two elements 15, 16. Such a drawback is efficiently eliminated by the present invention.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A finger operated module for generating encoding signals, said module being used to generate encoding signals by controlling transmission of light in response to a finger operation of said module, said module partially protruding from a surface of an input device, comprising:

a base member;

a supporting member;

means for installing said supporting member on said base member;

a rotating member; and means for rotatably mounting said rotating member on said supporting member such that it partially protrudes from said surface of said input device to enable said rotating member to be rotated and translated by said finger operation, wherein an encoding signal generating media for controlling said transmitted light is mounted on a first surface of said rotating member.

2. The finger operated module of claim 1 further comprising:

a printed circuit board positioned on said supporting member;

a light emitting element mounted on said printed circuit board adjacent to said first surface of said rotating member for generating said light transmitted through said encoding signal generating media; and a light responsive element mounted on said printed circuit board adjacent to a second surface of said rotating member for receiving said light to generate digital signals;

wherein said light emitting element and said light responsive element are able to be synchronously moved with said supporting member.

3. The finger operated module of claim 2 wherein a positioning plate and a pair of supporting pieces orthogonal to said positioning plate are provided on said base member, and each of said supporting pieces has a groove for allowing said supporting member to be movably installed on said base member.

4. The finger operated module of claim 3 wherein said rotating member includes an axle rotatably coupled to said supporting member.

5. The finger operated module of claim 4 wherein said supporting member comprises a first supporting element, a second supporting element and a connecting element for connecting said first and second supporting elements, wherein:

said first supporting element includes a first axis accommodated within said groove of one of said supporting pieces, and a first positioning hole for engaging said axis of said rotating member; and said second supporting element includes a second axis accommodated within said groove of the other one of said supporting pieces, and a second positioning hole for engaging said axis of said rotating member.

6. The finger operated module of claim 5 further comprising an elastic member, said elastic member having a first elastic arm biasing against a protruding portion of said supporting member and a second elastic arm biasing against said base member for providing said supporting member a spring force.

7. The finger operated module of claim 6 wherein said elastic member is mounted on said first axis of said first supporting element.

8. The finger operated module of claim 7 wherein said first supporting element further includes a protruding post for engaging with a switch installed in said input device when said rotating member is movably depressed.

9. The finger operated module of claim 8 wherein said encoding signal generating media can be a plurality of apertures which are disposed on a circumference of said surface of said rotating member.

10. The finger operated module of claim 9 further comprising a plurality of protuberances disposed on said circumference of said surface of said rotating member, and a contact element mounted between said first and second supporting elements, said contact element having a protrusion for correspondingly engaging with said protuberances to generate intermittent interception when said rotating member being rotated.

11. The finger operated module of claim 1 wherein said input device is a computer mouse.

* * * * *